US012810128B2

(12) United States Patent
Kim et al.

(10) Patent No.: US 12,810,128 B2
(45) Date of Patent: Nov. 24, 2026

(54) RESOURCE RESETTABLE DEEP NEURAL NETWORK ACCELERATOR, SYSTEM, AND METHOD

(71) Applicant: Electronics and Telecommunications Research Institute, Daejeon (KR)

(72) Inventors: Young Bin Kim, Daejeon (KR); Jin Ah Shin, Daejeon (KR); Chae Deok Lim, Daejeon (KR); Kyung Il Kim, Daejeon (KR); Beob Kyun Kim, Daejeon (KR); Duk Kyun Woo, Daejeon (KR); Dong Wan Ryoo, Daejeon (KR); Yoo Jin Lim, Daejeon (KR); Yang Jae Jeong, Daejeon (KR); Su Jung Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1027 days.

(21) Appl. No.: 17/966,469

(22) Filed: Oct. 14, 2022

(65) Prior Publication Data

US 2023/0121052 A1 Apr. 20, 2023

(30) Foreign Application Priority Data

Oct. 15, 2021 (KR) ........................ 10-2021-0137558
Jul. 26, 2022 (KR) ........................ 10-2022-0092237

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC .......... G06N 3/063; G06N 3/04; Y02D 10/00; G06F 1/3287; G06F 9/5016; G06F 9/5022; G06F 8/45
See application file for complete search history.

(56) References Cited

U.S. PATENT DOCUMENTS 11,144,822 B1 * 10/2021 Nez .......................... G06N 5/04
11,893,475 B2 * 2/2024 Nez ........................ G06N 3/063
(Continued)

FOREIGN PATENT DOCUMENTS

KR 10-2019-0133555 12/2019
KR 10-2020-0143479 12/2020
(Continued)

OTHER PUBLICATIONS

Wu, Mingchuan, et al. "Bandwidth-aware loop tiling for dma-supported scratchpad memory." Proceedings of the ACM International Conference on Parallel Architectures and Compilation Techniques. 2020. (Year: 2020).*
(Continued)

*Primary Examiner* — Jennifer N Welch
(74) *Attorney, Agent, or Firm* — KILE PARK REED & HOUTTEMAN PLLC

(57) ABSTRACT

A resource resettable deep neural network accelerator according to an embodiment of the present disclosure includes: a memory layer including a scratchpad memory layer configured to divide deep neural network parameter data (hereinafter, data) in an external memory layer into a plurality of tiles and to load the divided tiles, and a register file memory layer configured to load tiled data of the scratchpad memory layer; and a plurality of cores configured to process an inference operation for the data loaded in the register file memory layer, wherein the memory layer includes a virtual tiling layer added to a certain location for
(Continued)

loading the tiled data from a previous memory layer so as to correspond to a specific tiling size.

13 Claims, 5 Drawing Sheets

(56) References Cited

U.S. PATENT DOCUMENTS

| | | | | |
|---|---|---|---|---|
| 11,934,826 | B2 * | 3/2024 | Norrie | G06F 9/3004 |
| 2019/0079801 | A1 | 3/2019 | Lyuh et al. | |
| 2019/0164036 | A1 | 5/2019 | Kim et al. | |
| 2021/0263739 | A1 * | 8/2021 | Norrie | G06F 9/30036 |
| 2022/0156071 | A1 * | 5/2022 | Norrie | G06F 9/30036 |
| 2022/0179714 | A1 * | 6/2022 | Jung | G06N 3/063 |
| 2022/0215236 | A1 * | 7/2022 | Nez | G06F 17/16 |
| 2022/0283984 | A1 * | 9/2022 | Kim | G06F 9/3001 |

FOREIGN PATENT DOCUMENTS

| | | |
|---|---|---|
| KR | 10-2021-0055582 | 5/2021 |
| KR | 10-2021-0086447 | 7/2021 |
| KR | 10-2272839 | 7/2021 |

OTHER PUBLICATIONS

Jafri, Syed Mah, Ahmed Hemani, and Dimmitrios Stathis. “Can a reconfigurable architecture beat ASIC as a CNN accelerator?.” 2017 International Conference on Embedded Computer Systems: Architectures, Modeling, and Simulation (SAMOS). IEEE, 2017. (Year: 2017).*

Lu et al. (“A Runtime Reconfigurable Design of Compute-in-Memory-Based Hardware Accelerator for Deep Learning Interence”, ACM, Jun. 28, 2021, pp. 1-19).*

Mingchuan Wu, et al, “Bandwidth-Aware Loop Tiling for DMA-Supported Scratchpad Memory”, Proceedings of the ACM International Conference on Parallel Architectures and Compilation Techniques, ACMPUB27, New York, USA, Sep. 30, 2020.

Kuejun Yang, et al., “Improving Scratchpad Allocation with Demand-Driven Data Tiling”, Proceedings of the 2010 International Conference on Compilers, Architectures and Synthesis for Embedded Systems, Cases ’10, ACM Press, New York, USA, Oct. 24, 2010.

Vivienne Sze, et al., “Efficient Processing of Deep Neural Networks: A Tutorial and Survey”, arXiv:1703.09039v1, Cornell University Library, 201 OLIN Library Conell University Ithaca, NY 14853, Mar. 27, 2017.

Fuyang Li et al., “Checkpointing-Aware Loop Tiling for Energy Harvesting Powered Nonvolatile Processors,” IEEE Transactions on Computer-Aided Design of Integrated Circuits and Systems, vol. 38, No. 1, Jan. 2019, pp. 15-28.

* cited by examiner

RESOURCE RESETTABLE DEEP NEURAL NETWORK ACCELERATOR, SYSTEM, AND METHOD

CROSS-REFERENCE TO RELATED APPLICATION

This application claims priority to and the benefit of Korean Patent Application No. 10-2021-0137558, filed on Oct. 15, 2021, and Korean Patent Application No. 10-2022-0092237, filed on Jul. 26, 2022, the disclosure of which is incorporated herein by reference in its entirety.

BACKGROUND

1. Technical Field

The present disclosure relates to a resource resettable deep neural network accelerator, system and method.

2. Related Art

Recently, a deep neural network has shown high accuracy in various fields, and has been widely used in application to various devices. Unlike the existing mechanical learning technique, the deep neural network shows high accuracy by learning features as well as a classifier from data.

Meanwhile, in order to use the deep neural network, there is a problem in that lots of storage space and high calculation performance are required, and one scheme for solving such a problem is to utilize the deep neural network based on cloud computing. However, the cloud computing has the problem of very high power consumption due to communications between a server and a device.

In order to solve such a problem, a deep neural network accelerator for utilizing the deep neural network in an on-device has been proposed. The deep neural network accelerator has a deep neural network inference acceleration function built therein, and thus has the advantage of a reduced deep neural network inference time as compared with computing resources, low cost, and reduced power consumption as compared with the existing high-performance server.

However, since the early deep neural network accelerators are designed to perform only a limited dataflow, they have problems in that an optimum dataflow according to the application of the deep neural network is unable to be used.

SUMMARY

In order to solve the above problems, the present disclosure provides a resource resettable deep neural network accelerator, system and method, which can adjust power consumption during inference by reconfiguring resources, such as memories or cores, while the deep neural network accelerator performs the inference.

However, problems to be solved by the present disclosure are not limited to the above-described problems, and other problems may exist.

In a first aspect of the present disclosure to solve the above problem, a resource resettable deep neural network accelerator includes: a memory layer including a scratchpad memory layer configured to divide deep neural network parameter data (hereinafter, data) in an external memory layer into a plurality of tiles and to load the divided tiles, and a register file memory layer configured to load tiled data of the scratchpad memory layer; and a plurality of cores configured to process an inference operation for the data loaded in the register file memory layer, wherein the memory layer includes a virtual tiling layer added to a certain location for loading the tiled data from a previous memory layer so as to correspond to a specific tiling size.

In a second aspect of the present disclosure, a resource resetting method in a deep neural network accelerator, includes: reading a value of a virtual tiling register as a corresponding loop is performed; setting a tiling size of a virtual tiling layer based on the read value of the virtual tiling register; changing a tiling size of an associated resource based on the tiling size of the virtual tiling layer; and releasing a resource allocation of an unused associated resource among associated resources of which usage amounts are adjusted in accordance with the tiling size.

In a third aspect of the present disclosure, a resource resetting system includes: a deep neural network accelerator including an associated resource including at least one of a scratchpad memory layer, a register file memory layer, and a core, and a virtual tiling layer of which a tiling size is set based on a value of a virtual tiling register; and a host system configured to determine whether to activate the associated resource by setting the value of the virtual tiling register while the deep neural network accelerator performs an inference.

In another aspect of the present disclosure to solve the above problem, a computer program executes a resource resetting method in combination with a hardware computer, and is stored in a computer-readable recording medium.

Other detailed matters of the present disclosure are included in the detailed description and drawings.

According to an embodiment of the present disclosure described above, the host system can control the power consumption of the accelerator by deactivating or reactivating some of the resources even while the deep neural network accelerator performs the inference. This function can increase the management efficiency of the system that should actively manage the power consumption in an intermittent computing environment in which several to tens of times of power-offs occur per second.

Effects of the present disclosure are not limited to those described above, and other unmentioned effects will be able to be clearly understood by those of ordinary skill in the art from the following description.

DETAILED DESCRIPTION

Figure 1:
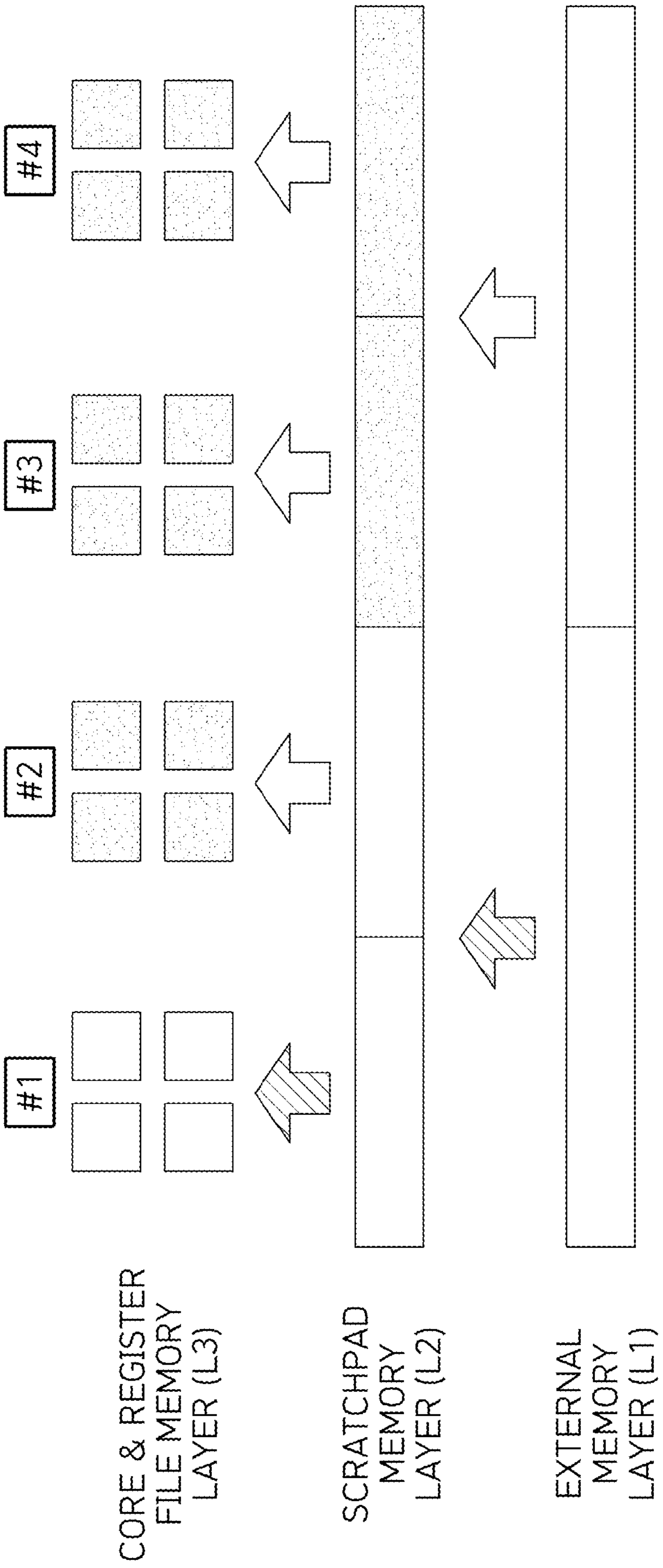
FIG. 1 is a diagram illustrating an example of a dataflow in a deep neural network accelerator.

The aspects and features of the present disclosure and methods for achieving the aspects and features will be apparent by referring to embodiments to be described in detail with reference to the accompanying drawings. However, the present disclosure is not limited to the embodiments disclosed below, and it can be implemented in various different forms. However, the embodiments are provided to complete the present disclosure and to assist those of ordinary skill in the art in a comprehensive understanding of the scope of the present disclosure, and the present disclosure is only defined by the scope of the appended claims.

Terms used in the description are to explain the embodiments, but are not intended to limit the present disclosure. In the description, unless specially described on the context, a singular form includes a plural form. In the description, the term "comprises" and/or "comprising" should be interpreted as not excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first", "second", and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element in the technical idea of the present disclosure.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Hereinafter, to help understanding of those skilled in the art, backgrounds in which the present disclosure is proposed will be first described, and then, the present disclosure will be described in detail.

A deep neural network accelerator is a device for quickly performing an inference through a deep neural network. In the deep neural network accelerator, cores each including a small register file and a functional unit perform operations in parallel. Further, the deep neural network accelerator may include a memory layer, and may generally include a memory layer of an external memory—internal scratchpad memory—register file.

The deep neural network is composed of nested loops with multiple steps, and includes a large amount of parameter data. In this case, since the scratchpad memory in the deep neural network accelerator is unable to load all parameter data of the deep neural network at once, it divides the parameter data into those of a smaller size, and then sequentially loads them, which is called tiling. Such tiling also occurs between the scratchpad memory and the register file memory in the core.

Further, since the loop of the deep neural network has no dependency with the previous loop, the final results have the same property even if the access order is randomly changed (loop interchange). Accordingly, the deep neural network can perform the inference in so many ways in accordance with a tiling and loop nesting order, and such an inference performing method is called dataflow.

FIG. 1 is a diagram illustrating an example of a dataflow in a deep neural network accelerator.

FIG. 1 simply illustrates a dataflow of a deep neural network accelerator having four cores. In the dataflow of FIG. 1, deep neural network parameter data (hereinafter, data) in an external memory layer L1 is divided into two units to load the divided units in a scratchpad memory layer L2, and the scratchpad memory layer L2 is divided into two units, so that four cores L3 perform an inference operation for the data. The unloaded data are sequentially processed according to time, and in an example of FIG. 1, entire data can be processed through total four times of iterations.

Meanwhile, the early deep neural network accelerators are designed to perform only a limited kind of dataflow, and thus an optimum dataflow according to the application characteristics of the deep neural network may be unable to be used.

In order to improve on such limitations, resettable deep neural network accelerator architectures for being capable of arbitrarily changing the configuration of a network on chip (NoC) have been studied.

However, in a case of such architectures, it is not possible to perform resource resetting while the deep neural network accelerator performs an inference.

In order to solve such problems, an embodiment of the present disclosure enables the system to manage power precisely as well as maintaining an accuracy of the inference by enabling the deep neural network accelerator to perform resource resetting while performing the inference. Such characteristics may help to increase the performance efficiency of an environment, such as an intermittent computing environment, in which several to tens of times of power depletions occur per second.

Hereinafter, referring to FIGS. 2 to 4, a resource resetting system 1 and a deep neural network accelerator 100 according to an embodiment of the present disclosure will be described.

Figure 2:
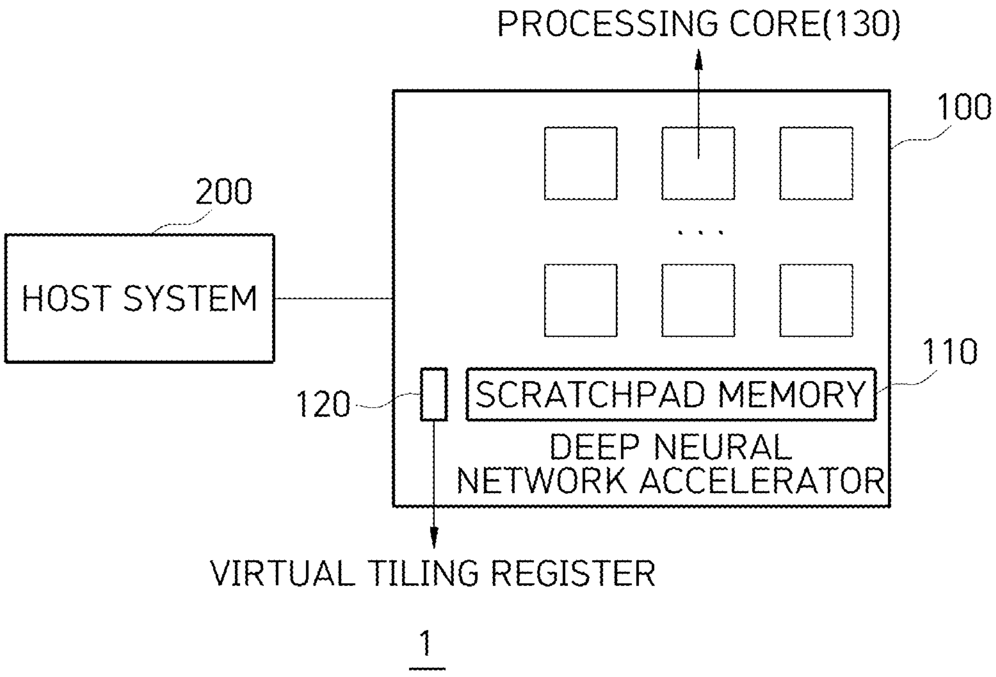
FIG. 2 is a block diagram of a resource resetting system according to an embodiment of the present disclosure.

FIG. 2 is a block diagram of a resource resetting system 1 according to an embodiment of the present disclosure. FIG. 3 is a diagram illustrating an example of a dataflow through a virtual tiling layer L3. FIG. 4 is a diagram illustrating another example of a dataflow through a virtual tiling layer L2.

The resource resetting system 1 according to an embodiment of the present disclosure includes a deep neural network accelerator 100 and a host system 200.

The deep neural network accelerator 100 includes an associated resource including at least one of a scratchpad memory 110, a register file memory (not illustrated), and a plurality of cores 130, and a virtual tiling layer provided through a virtual tiling register 120. In this case, the associated resource means a resource being adjusted by the virtual tiling layer.

In an embodiment of the present disclosure, the plurality of cores 130 performs an inference operation for data loaded in a register file memory layer.

According to an embodiment of the present disclosure, a memory layer may be composed of an external memory layer, a scratchpad memory layer inside the deep neural network accelerator 100, and a register file memory layer.

The scratchpad memory layer divides data in the external memory layer into a plurality of tiles, and loads the divided tiles. Further, the register file memory layer loads the tiled data of the scratchpad memory layer.

In this case, the deep neural network accelerator 100 according to an embodiment of the present disclosure may be additionally provided with a virtual tiling layer. The virtual tiling layer may load the tiled data from a previous memory layer so as to correspond to a specific tiling size, and may be added to a certain location in the memory layer.

As an embodiment, the virtual tiling layer is a tiling layer which is added to the preconfigured dataflow, and which can be changed while the inference operation is performed. According to an embodiment of the present disclosure, the usage amount of the associated resource can be adjusted based on the tiling size of the virtual tiling layer.

Further, as the usage amount of the associated resource is adjusted, the resource allocation of the unused associated resource is released. As an example, the power consumption of the unused associated resource through the virtual tiling may be limited through a power-off technique such as power gating.

Figure 3:
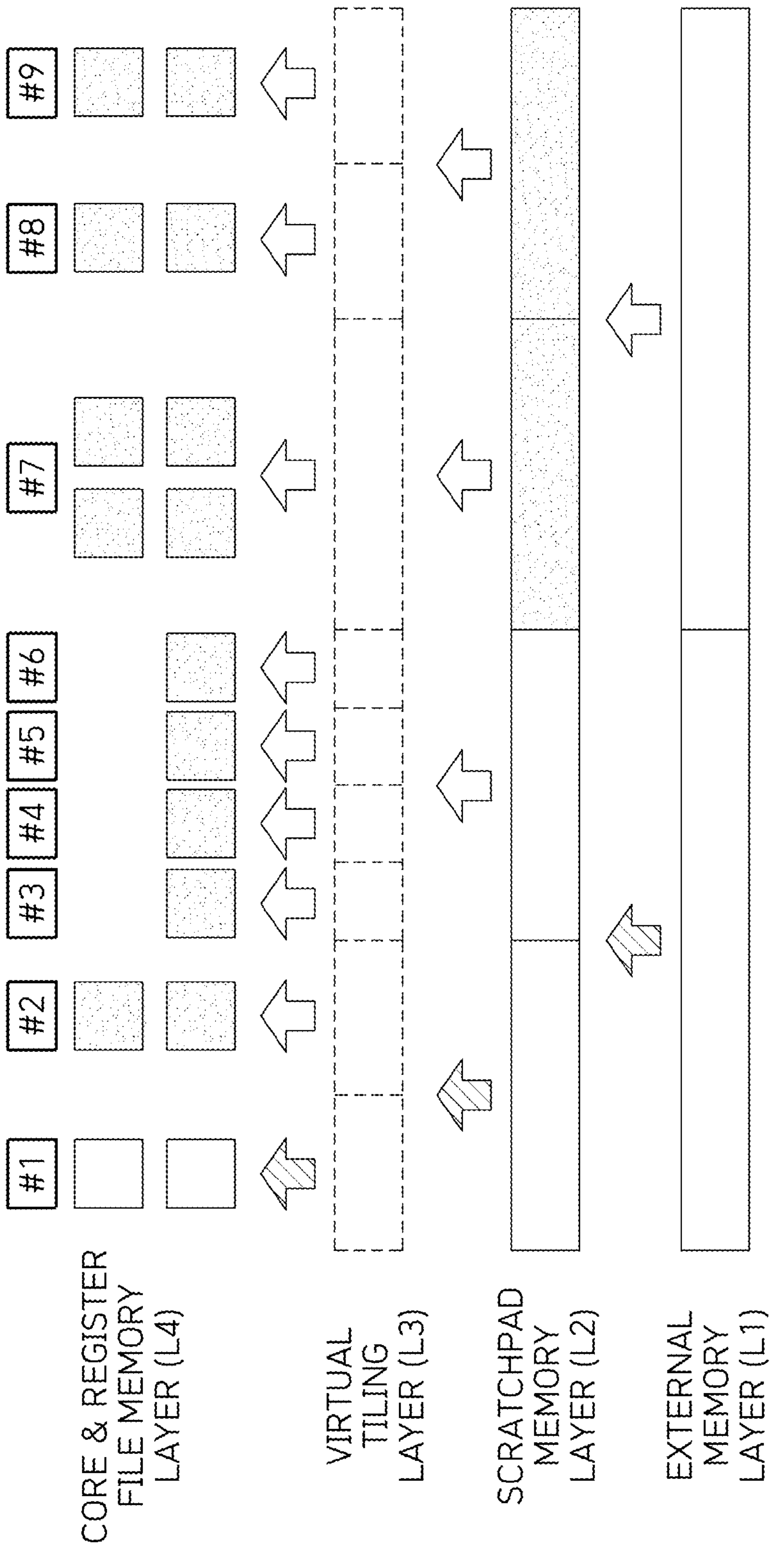
FIG. 3 is a diagram illustrating an example of a dataflow through a virtual tiling layer.

In an embodiment of the FIG. 3, the virtual tiling layer L3 exists between a scratchpad memory layer L2 and a register file memory layer L4, and through this, the virtual tiling layer L3 adjust the usage amount of the core 130.

In this case, the tiling size of the virtual tiling layer L3 may be updated whenever each loop starts, and thus the number of cores 130 being used may be changed.

In an embodiment of FIG. 3, the core 130 is set as the associated resource, and the number of cores 130 that operate in reverse proportion to the change of the tiling size of the virtual tiling layer L3 is adjusted. That is, in a case that the tiling size is determined as N (N is a natural number that is equal to or larger than 2) when a corresponding loop is performed, 1/N cores among the plurality of cores 130 may be allocated as resources for performing the corresponding loop.

For example, when the first tile of the scratchpad memory layer L2 is processed, the tiling size of the virtual tiling layer L3 is set to 2, and thus only a half of the four cores 130 is used, but performs twice iterative inference operations.

In contrast, when the second tile of the scratchpad memory layer L2 is processed, the tiling size of the virtual tiling layer L3 is set to 4, and thus only one of the four cores 130, being in an active state, performs the inference operation, and performs four times iterative operations.

In an embodiment of the present disclosure, the associated resource may be the scratchpad memory layer or a register file memory layer in addition to the core 130.

As another example, the virtual tiling layer L2 exists between the external memory layer L1 and the scratchpad memory layer L3, and may be configured to adjust the usage of the scratchpad memory 110.

Figure 4:
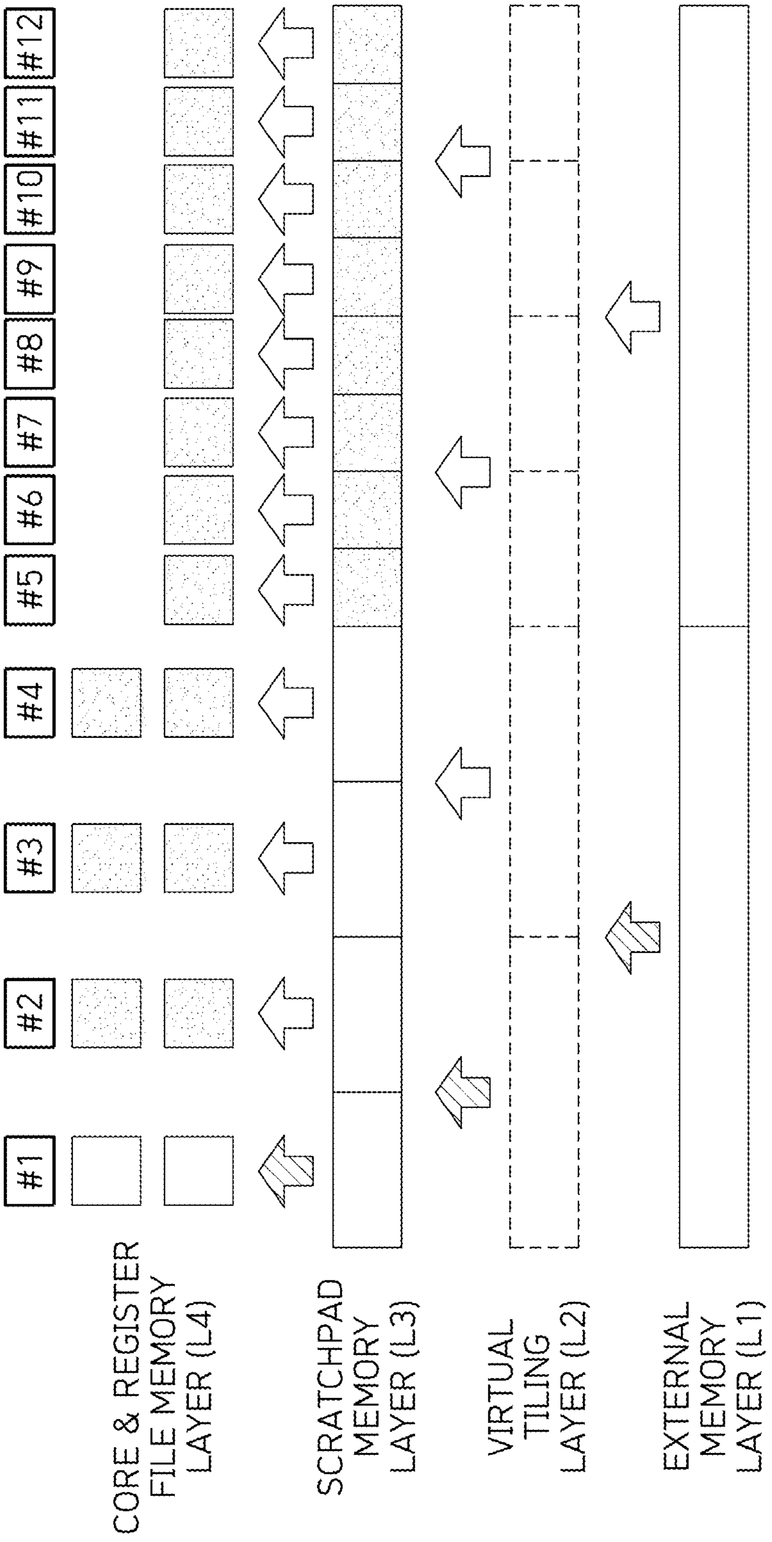
FIG. 4 is a diagram illustrating another example of a dataflow through a virtual tiling layer.

In an embodiment of FIG. 4, the scratchpad memory 100 is set as the associated resource, and the number of scratchpad memories 110 that operate in reverse proportion to the change of the tiling size of the virtual tiling layer L2 is adjusted. That is, in a case that the tiling size is determined as N (N is a natural number that is equal to or larger than 2) when a corresponding loop is performed, 1/N scratchpad memory layers L3 may be allocated as resources for performing the corresponding loop.

For example, when processing the first tile of the external memory layer L1, the tiling size of the virtual tiling layer L2 is set to 2. Accordingly, only a half of the scratchpad memory layers L3 and only a half of the four cores 130 are used as resources, but twice the iterative inference operations are performed. In this case, before the virtual tiling layer L2 is set, the scratchpad memory layer L3 may have been divided and set in proportion to the number of cores 130 or the tiling size of the external memory layer L1 as illustrated in FIG. 1.

In contrast, when the second tile of the external memory layer L1 is processed, the tiling size of the virtual tiling layer L2 is changed and set to 4, and thus the scratchpad memory layer L3 is divided and used in the unit of four, and only one of the four cores 130, being in an active state, performs the inference operation to correspond to this, and performs four times iterative operations.

As described above, an embodiment of the present disclosure can adjust the resource allocation of individual associated resources, such as the scratchpad memory layer, the register file memory layer, and the core, through the virtual tiling layer, and may simultaneously adjust a plurality of associated resources according to embodiments.

As described above, in a case that one resource is associated, and the tiling size is N, the size of the associated resource becomes 1/N. Unlike this, in a case that a plurality of resources are associated, a rule for updating the associated resource is necessary, and this may be provided in hardware or software.

Meanwhile, in an embodiment of the present disclosure, the location of the virtual tiling layer may be set in hardware or software. As an embodiment, the deep neural network accelerator 100 can be designed by disposing the virtual tiling layer between the scratchpad memory layer and the core (register file memory layer) in hardware. As another embodiment, the host system 200 may be implemented to set the location of the virtual tiling through a software interface.

Referring back to FIG. 2, the virtual tiling register 120 is a specific address of a register or a memory that is added to the structure of the deep neural network accelerator 100, and the host system 200 may asynchronously change the value of the virtual tiling register 120.

In this case, the host system 200 may determine the value of the tiling register through a certain algorithm. As an embodiment, the host system 200 may calculate the tiling size in accordance with a target power level by using a pre-calculated table. As another embodiment, the host system 200 may update the value of the tiling register of the deep neural network accelerator 100 by calculating the tiling size in real time through a kernel.

If the value of the virtual tiling register 120 is determined by the host system 200, the deep neural network accelerator 100 sets the tiling size based on the value of the virtual tiling register 120 before starting the performing of the virtual tiling layer, and it changes the tiling size of the associated resource.

As an embodiment, the tiling size of the virtual tiling layer may be updated whenever each loop of the deep neural network is performed. Before each loop is performed, the deep neural network accelerator 100 reads the value of the virtual tiling register 120, and sets the tiling size based on the read value of the virtual tiling register 120. Accordingly, the tiling size of the associated resource is determined, and after the tiling size of the associated resource is determined, processing of the associated resource such as the release of the resource allocation for the unused associated resource is performed.

Of course, in an embodiment of the present disclosure, the tiling size may be equally updated throughout the entire loops, and the entire loops may be performed.

Hereinafter, a resource resetting method that is performed by a deep neural network accelerator 100 of a resource resetting system 1 according to an embodiment of the present disclosure will be described with reference to FIG. 5.

Figure 5:
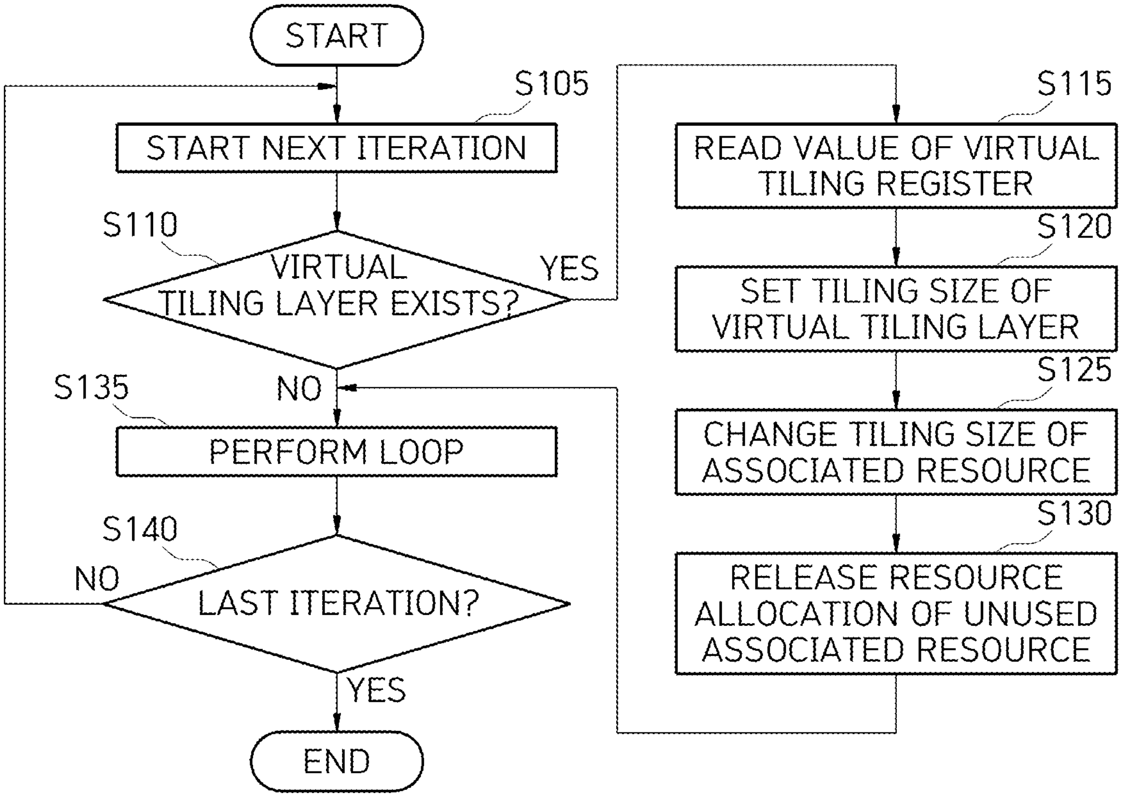
FIG. 5 is a flowchart of a resource resetting method according to an embodiment of the present disclosure.

FIG. 5 is a flowchart of a resource resetting method according to an embodiment of the present disclosure.

As a corresponding loop starts (S105), the deep neural network accelerator 100 identifies whether a virtual tiling layer exists (S110).

If the virtual tiling layer does not exist as the result of the identification (S110-N), the deep neural network accelerator 100 performs the loop in a general procedure (S135).

Unlike this, if the virtual tiling layer exists as the result of the identification (S110-Y), the deep neural network accelerator 100 reads the value of a virtual tiling register 120 (S115).

Then, the deep neural network accelerator 100 sets the tiling size of the virtual tiling layer based on the read value of the virtual tiling register 120 (S120).

Next, the deep neural network accelerator 100 changes the tiling size of the associated resource based on the tiling size of the virtual tiling layer (S125), and releases the resource allocation of the unused associated resource among the associated resources of which the usage amounts are adjusted in accordance with the tiling size (S130). Thereafter, the deep neural network accelerator 100 performs the corresponding loop with the reset resource (S135).

The above-described process is iteratively performed until the entire loop performing is completed (S140).

Meanwhile, in the above explanation, steps S105 to S140 may be further divided into additional steps or may be combined into fewer steps in accordance with the implementation examples of the present disclosure. Further, if necessary, some steps may be omitted, or the order of the steps may be changed. In addition, even other omitted contents of FIGS. 2 to 4 may also be applied to the resource resetting method of FIG. 5.

An embodiment of the present disclosure described above may be implemented as a program (or application) to be executed in combination with a hardware computer, and may be stored in a medium.

In order for the computer to read the above-described program so as to execute the above methods implemented as the program, the program may include a code coded by a computer language, such as C, C++, JAVA, Ruby, and machine language, which can be read by a processor (CPU) of the computer through a device interface of the computer. Such a code may include a functional code related to a function that defines functions necessary to execute the above methods, and may include a control code related to an execution procedure necessary for the processor of the computer to execute the above functions according to a specific procedure. Further, such a code may further include a memory reference related code regarding at which location (address) of an internal or external memory of the computer additional information or media necessary for the processor of the computer to execute the above functions is to be referred to. Further, in case that the processor of the computer is required to communicate with any other remote computer or server to execute the above functions, the code may further include a communication related code regarding how to communicate with any other remote computer or server by using a communication module of the computer, or which information or medium is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but are not limited thereto. That is, the program may be stored in various recording media on various servers that can be accessed by the computer, or various recording medium on a user's computer. Further, the medium may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A resource resettable deep neural network accelerator comprising:

a memory layer including a scratchpad memory layer configured to divide deep neural network parameter data in an external memory layer into a plurality of tiles and to load the divided tiles, and a register file memory layer configured to load tiled data of the scratchpad memory layer; and a plurality of cores configured to process an inference operation for the tiled data loaded in the register file memory layer, wherein the memory layer includes a virtual tiling layer added to a certain location for loading the tiled data from a previous memory layer so as to correspond to a specific tiling size, wherein in a case that the specific tiling size is determined as N when a corresponding loop is performed, N being a natural number that is equal to or larger than 2:

1/N cores among the plurality of cores are allocated as resources for performing the corresponding loop; or 1/N of a plurality of blocks of the scratchpad memory layer are allocated as resources for performing the corresponding loop, wherein the specific tiling size is determined and applied each time the corresponding loop is performed during an inference operation, and wherein a proportional subset consisting of 1/N of the plurality of cores or 1/N of the plurality of blocks of the scratchpad memory layer is dynamically de-allocated and reallocated as active resources in accordance with the specific tiling size N each time the corresponding loop is performed.

2. The accelerator of claim 1, wherein a usage amount of an associated resource including at least one of the scratchpad memory layer, the register file memory layer, and the core is adjusted based on the specific tiling size of the virtual tiling layer.

3. The accelerator of claim 1, wherein the virtual tiling layer is added between the scratchpad memory layer and the register file memory layer.

4. The accelerator of claim 1, wherein the virtual tiling layer is added between the external memory layer and the scratchpad memory layer.

5. The accelerator of claim 1, wherein a location of the virtual tiling layer is set through a software interface of a host system.

6. The accelerator of claim 1, wherein the specific tiling size of the virtual tiling layer is set based on a value of a virtual tiling register that is determined by a host system.

7. The accelerator of claim 1, wherein the specific tiling size of the virtual tiling layer is set based on a value of a virtual tiling register, and wherein a host system asynchronously updates the value of the virtual tiling register between loop iterations while the deep neural network accelerator is performing the inference operation, such that the specific tiling size is changeable without interrupting the inference operation.

8. A resource resetting method in a deep neural network accelerator, comprising:

reading a value of a virtual tiling register as a corresponding loop is performed;

setting a specific tiling size of a virtual tiling layer based on the read value of the virtual tiling register;

changing a tiling size of an associated resource based on the specific tiling size of the virtual tiling layer; and releasing a resource allocation of an unused associated resource among associated resources of which usage amounts are adjusted in accordance with the specific tiling size, wherein the changing comprises:

allocating 1/N cores among the plurality of cores-to the tiling size of the as resources for performing a corresponding loop, in a case that the specific tiling size is determined as N, N being a natural number that is equal to or larger than 2; or allocating 1/N of the plurality of blocks of the scratchpad memory layer as resources for performing the corresponding loop, in the case that the specific tiling size is determined as N, wherein the specific tiling size is determined and applied each time the corresponding loop is performed during an inference operation, and wherein a proportional subset consisting of 1/N of the plurality of cores or 1/N of the plurality of blocks of the scratchpad memory layer is dynamically de-allocated and reallocated as active resources in accordance with the specific tiling size N each time the corresponding loop is performed.

9. The method of claim 8, wherein the value of the virtual tiling register is asynchronously set by a host system between loop iterations while the deep neural network accelerator is performing the inference operation, such that the specific tiling size of the virtual tiling layer is changeable without interrupting the inference operation.

10. A resource resetting system comprising:

a deep neural network accelerator including an associated resource including at least one of a scratchpad memory layer, a register file memory layer, and a core, and a virtual tiling layer of which a specific tiling size is set based on a value of a virtual tiling register; and a host system configured to determine whether to activate the associated resource by setting the value of the virtual tiling register while the deep neural network accelerator performs an inference, wherein in a case that the specific tiling size is determined as N when a corresponding loop is performed, N being a natural number that is equal to or larger than 2:

1/N cores among a plurality of cores are allocated as resources for performing the corresponding loop; or 1/N of a plurality of blocks of the scratchpad memory layer are allocated as resources for performing the corresponding loop, wherein the specific tiling size is determined and applied each time the corresponding loop is performed during the inference operation, and wherein a proportional subset consisting of 1/N of the plurality of cores or 1/N of the plurality of blocks of the scratchpad memory layer is dynamically de-allocated and reallocated as active resources in accordance with the specific tiling size N each time the corresponding loop is performed.

11. The system of claim 10, wherein the virtual tiling layer is added to a certain location in a hierarchical structure with the associated resource, and is configured to load tiled data from the hierarchical structure so as to correspond to the specific tiling size.

12. The system of claim 10, wherein the host system sets a location of the virtual tiling layer through a software interface.

13. The system of claim 10, wherein the host system asynchronously updates the value of the virtual tiling register between loop iterations while the deep neural network accelerator is performing the inference operation, such that the specific tiling size is changeable without interrupting the inference operation.

* * * * *